United States Patent [19]

Riehle

[11] 4,245,401
[45] Jan. 20, 1981

[54] PLANNING DEVICE

[76] Inventor: Harald Riehle, Anna-Schieber-Weg-16, 7300 Esslingen, Fed. Rep. of Germany

[21] Appl. No.: 83,063

[22] Filed: Oct. 9, 1979

Related U.S. Application Data

[63] Continuation of Ser. No. 884,314, Mar. 7, 1978, abandoned.

[30] Foreign Application Priority Data

May 10, 1977 [DE] Fed. Rep. of Germany ....... 2720906

[51] Int. Cl.³ .......................... G09B 29/00; G09F 7/12
[52] U.S. Cl. ..................................... 434/430; 40/594; 434/80
[58] Field of Search .................... 35/7 R, 7 A, 16, 27, 35/28, DIG. 3; 40/10 D, 594; 273/157 A; 96/43

[56] References Cited

U.S. PATENT DOCUMENTS

| | | | |
|---|---|---|---|
| 2,586,039 | 2/1952 | Heggedal | 40/954 |
| 3,889,397 | 6/1975 | Flood | 35/28 X |
| 3,974,576 | 8/1976 | Quinn | 35/28 |

FOREIGN PATENT DOCUMENTS 662109  8/1965  Belgium ....................................... 35/16

Primary Examiner—Harland S. Skogquist
Attorney, Agent, or Firm—Edwin E. Greigg

[57] ABSTRACT

A planning device comprising a base foil and a transparent foil hingeably connected to each other along one edge. Both the surface of the transparent foil and the surface of the base foil adjacent to the transparent foil are smooth for repeated, releasable pressure-adherence to each other. Any object having a smooth surface can be repeatedly and releasably pressure-adhered to the smooth surface of the transparent foil. The device preferably comprises a cover foil hingeably connected to the transparent foil along one edge. The surface of the cover foil adjacent to the transparent foil is preferably also smooth so that the cover foil may be repeatedly and releasably pressure-adhered to the transparent foil.

11 Claims, 2 Drawing Figures

PLANNING DEVICE

This is a continuation of application Ser. No. 884,314, filed Mar. 7, 1978 and now abandoned.

BACKGROUND OF THE INVENTION

The invention relates to a planning device.

It is known that smooth surfaces may be pressed onto other smooth surfaces, e.g. pliable soft foils, in such a way that they adhere due to self-adhering forces (German patent specifications Nos. 845 441, 1 286 755, 1 179 095) produced by the exclusion of air when the surfaces are pressed together. Planning devices made in this way are so arranged that relatively stiff planning symbols provided with a smooth surface are pressed on to the soft smooth foil which is provided with a base of foam material. If one wants to experiment with it on a drawn representation, e.g. a plan view or diagram, with various arrangement of individual planning elements, one has to press the plan view, plan or the diagram onto the foil.

An older suggestion (patent application No. P 26 24 960.5-52 of June 3, 1976 and published Sept. 29, 1977) provides a planning device of the kind mentioned above. In such device a smooth foil is laminated on a sheet of paper provided with a plan view, plan or a diagram which is to be used for planning. A smooth foil provided with a layer of adhesive is adhered on to the sheet of paper with the plan view, plan or diagram; the planning elements are then pressed onto the smooth foil.

This old suggestion provides a permanent connection of the sheet of paper with the smooth foil, so that the smooth foil may be used only for one sheet of paper and consequently only for one plan etc. This is not disadvantageous in cases when the same plan etc. is to be used all of the time; it is, however, also required that without permanent connection of the smooth foil and the sheet of paper, one should be able to safely plan even in cases where planning should take place only several times for one plan, plan view or diagram. A smooth foil should therefore be usable also for a plurality of plans etc.

The aim of the invention is to devise such a planning device of the aforementioned type in which the same planning device may be used for a plurality of sheets of paper and does not require a permanent connection with the smooth foil.

SUMMARY OF THE INVENTION

In such a device any sheet of paper may be inserted between the smooth foil and the further foil which is relatively stiff and is situated below the smooth foil, the smooth foil adhering on the marginal area of the further foil which extends beyond the sheet of paper, to provide a connection which is at any time easily detachable but provides a sufficiently strong connection. After that, one can experiment with the planning elements on the smooth foil through which the inserted sheet of paper and the plan etc. drawn thereon is visible. If a transparent drawing is used as the sheet of paper, the whole device may be heliographically photocopied so that the individual experimental planning results may be recorded and reproduced. This is important, particularly in cases where certain arrangements (e.g. the arrangement of furniture in large offices) is constantly changed and the copies or photocopies always record the latest state of the arrangement. The invention also provides various advantageous further developments.

BRIEF DESCRIPTION OF THE DRAWINGS

One embodiment will now be described in more detail, by way of example, with reference to the accompanying drawings. In the drawings.

DESCRIPTION OF THE PREFERRED EMBODIMENT

Figure 1:
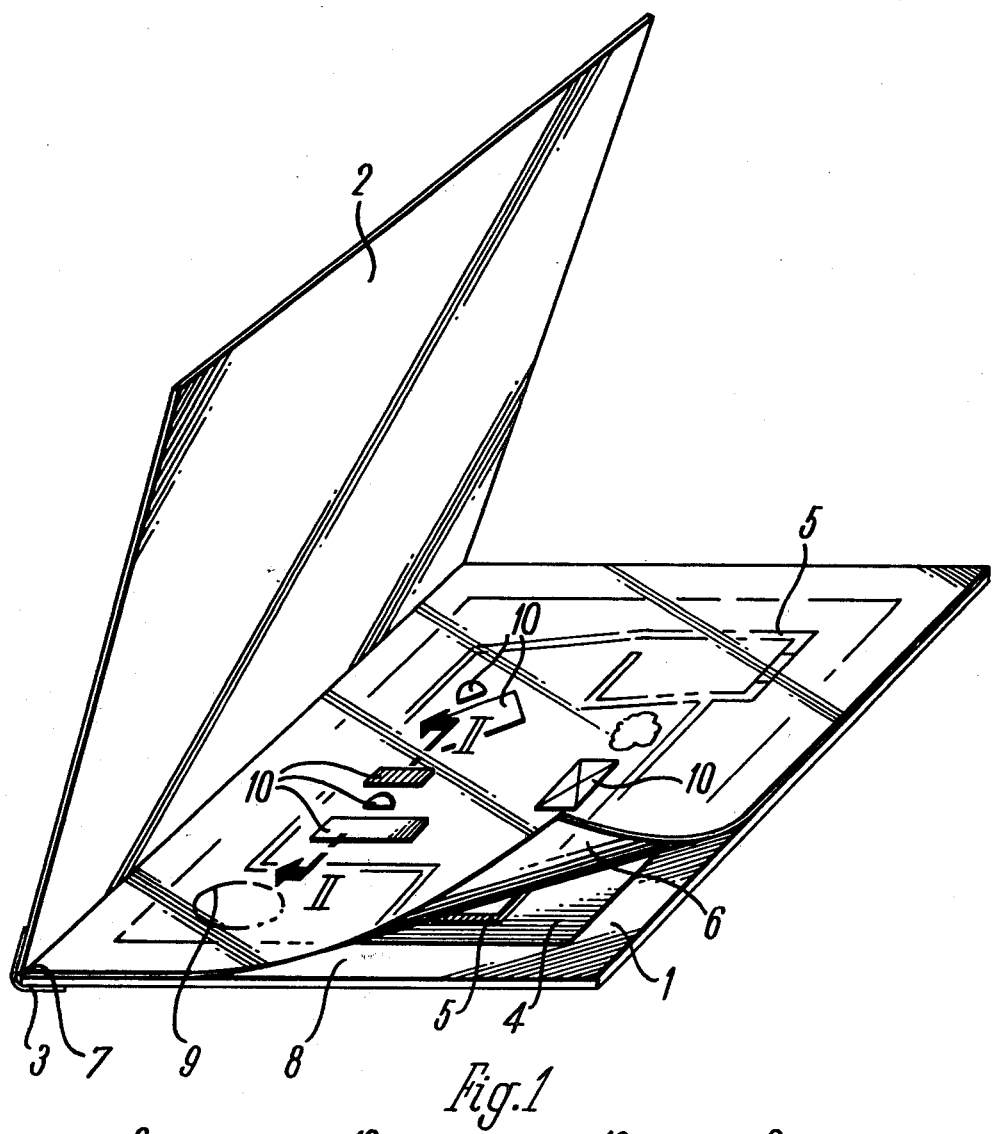
FIG. 1 shows an embodiment of the invention.

The planning device of the invention comprises a first, relatively stiff first, base foil 1 from a transparent, highly polished and consequently smooth material. A second foil 2 from the same material is suitably arranged on the first foil 1. The foils 1 and 2 are connected together by means of a connecting strip 3. A sheet 4 of paper is positioned on the foil 1. The size of the sheet 4 of paper is smaller than that of the foil 1 whereby a marginal strip 8, not covered by the sheet 4 of paper, is formed. The sheet 4 of paper consists of transparent paper and contains, in graphic representation, a plan or plan view 5. The sheet 4 of paper is also a carrier of the graphic representation (plan, plan view, diagram) which should serve as the basis of planning or disposition.

On the sheet 4 of paper is positioned a smooth foil 6. This foil is flexible and highly polished, i.e. also very smooth. It is a commercially available foil material, preferably an extremely soft PVC foil. This foil 6 is pivotally connected by means of a connecting strip 7 to the first, relatively stiff foil 1. The smooth foil 6 can be pressed on to the sheet 4 of paper in such a way that it adheres thereto on the marginal strip 8 of the foil 1, as the size of the sheet 4 of paper is smaller than that of the first foil 1. This connection is a connection known per se of two very smooth surfaces of which one is very flexible, due to self-adhering forces produced during pressing wherein air is excluded from between the overlying smooth surfaces. The adhesion caused by pressing along the marginal area 8 is sufficient to fix the sheet 4 of paper on to the foil 1. In order to promote this self-adherence, the sheet 4 of paper may be provided with several holes at places where this is no inscription, drawing or the like, so that at such places the smooth foil 6 lies on and adheres to the first foil 1. As an alternative, one or more strips of smooth foil may be glued on the bottom side of the sheet 4 of paper which then adheres to the foil 1, in order to assist self-adherence.

In this condition, planning can be carried out in that planning elements 10 are positioned on the adhesive foil 6, i.e. pressed thereon. The planning elements 10 are, however, not so flexible as the smooth foil 6 must be, and corresponding symbols, e.g. writing-tables, chairs, etc. are printed thereon. They may be fixed by pressing on onto the smooth foil 6 in any selected position.

When this is done, the foil 2 may be tiltably lowered so that it covers and protects the smooth foil 6 and the planning elements 10 which adhere thereto. As all the elements are transparent, e.g. photocopying may be made in this position.

Figure 2:
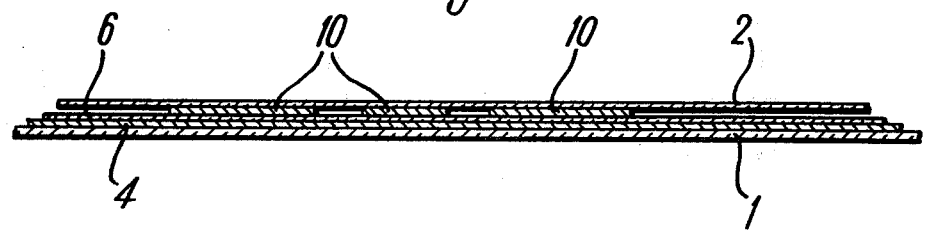
FIG. 2 is a sectional view taken along line II—II of FIG. 1 in the closed condition.

The partial sectional representation according to FIG. 2 is exaggerated in order to clearly distinguish the individual foils. The dimensions shown consequently do not correspond to the actual dimensions. This showing is however provided for clear explanation.

The assembly which is formed by the self-adherence of the smooth foil 6 onto the first foil 1 may be improved by sticking onto the sheet 4 of paper several strips of smooth foil.

I claim:

1. A planning device comprising a base foil having a self-adhering smooth surface, a paper sheet having a graphic representation thereon of a building plan or the like, said paper sheet being smaller in size than said base foil and removably disposed in overlying relationship with said base foil with the marginal edges of said paper sheet defining a marginal strip on said base foil, a transparent foil having two opposed self-adhering smooth surfaces, connection means for hingedly connecting said transparent foil to said base foil along one edge whereby said transparent foil is hingedly movable into overlying relationship with said base foil with releasable adherence between said base foil marginal strip and corresponding portions of one of said surfaces of said transparent foil and with said paper sheet sandwiched therebetween and at least one planning element having a smooth surface which may be repeatedly and releasably adhered to the other surface of said transparent foil.

2. A planning device according to claim 1 wherein the base foil is stiff and the transparent foil is flexible.

3. A planning device according to claim 1 wherein the base foil is transparent.

4. A planning device according to claim 1 wherein the first connection means is formed by a connecting strip.

5. A planning device according to claim 1, including a cover foil and second connection means for hingedly connecting said cover foil to said base foil and said transparent foil along said one edge.

6. A planning device according to claim 5 wherein the cover foil is stiff.

7. A planning device according to claim 5 wherein the cover foil is transparent.

8. A planning device according to claim 5 wherein the second connecting means is formed by a connecting strip.

9. A planning device according to claim 5 wherein the cover foil has a smooth surface for repeated releasable pressure-adherence between one of the smooth surfaces of said transparent foil and the smooth surface of said cover foil.

10. A planning device according to claim 5 wherein the cover foil is connected to the base foil.

11. A planning device according to claim 5 wherein the cover foil is connected to the transparent foil.

* * * * *